(12) United States Patent
Singh

(10) Patent No.: US 7,290,389 B2
(45) Date of Patent: Nov. 6, 2007

(54) HYDRAULIC DRIVE SYSTEM AND IMPROVED FILTER SUB-SYSTEM THEREFOR

(75) Inventor: Rodney V. Singh, Savage, MN (US)

(73) Assignee: Eaton Corporation, Cleveland, OH (US)

(*) Notice: Subject to any disclaimer, the term of this patent is extended or adjusted under 35 U.S.C. 154(b) by 769 days.

(21) Appl. No.: 10/828,590

(22) Filed: Apr. 21, 2004

(65) Prior Publication Data

US 2005/0016167 A1   Jan. 27, 2005

Related U.S. Application Data

(63) Continuation-in-part of application No. 10/624,805, filed on Jul. 22, 2003, now abandoned.

(51) Int. Cl.
*F16D 31/02* (2006.01)

(52) U.S. Cl. .......................................... 60/414; 60/454

(58) Field of Classification Search ................... 60/414, 60/454; 180/165; 280/216
See application file for complete search history.

(56) References Cited

U.S. PATENT DOCUMENTS 3,744,244 A * 7/1973 Swoager ..................... 60/454

2004/0103656 A1 * 6/2004 Frazer et al. ................. 60/414

* cited by examiner

*Primary Examiner*—F. Daniel Lopez
(74) *Attorney, Agent, or Firm*—Sonu N. Weaver (57) ABSTRACT

A hydraulic drive system (11) of the type including a hydrostatic pump-motor unit (35) having a pumping mode in which the unit pressurizes, from its port (A), a high pressure accumulator (41), and a motoring mode, in which the unit is driven by pressurized fluid from the high pressure accumulator. The system also includes a low pressure accumulator (39) in communication with the opposite port (B) of the pump-motor unit (35), and a filter circuit (107) disposed therebetween. The filter circuit (107) defines an unrestricted first flow path from the low pressure accumulator to the port (B) when the unit is in the pumping mode, and a second flow path from the port (B) to the low pressure accumulator when the unit is in the motoring mode. The second flow path comprises one path portion (125) through a filter shut-off valve (121) and a filter (127) in series, and in parallel therewith, another path portion through a controlled flow restriction (135). Thus, filtration occurs during only the motoring mode, and the percentage of fluid being filtered can be predetermined.

4 Claims, 4 Drawing Sheets

HYDRAULIC DRIVE SYSTEM AND IMPROVED FILTER SUB-SYSTEM THEREFOR

CROSS-REFERENCE TO RELATED APPLICATIONS

This application is a continuation-in-part (CIP) of application U.S. Ser. No. 10/624,805, filed Jul. 22, 2003, now abandoned in the name of Rodney V. Singe for a "Hydraulic Drive System And Improved Filter Sub-System Therefor".

BACKGROUND OF THE DISCLOSURE

The present invention relates to hydraulic drive systems of the type including a pump-motor unit which operates as a pump during a portion of the vehicle operating cycle, and as a motor during another portion of the vehicle operating cycle. Even more particularly, the present invention relates to an improved control circuit for controlling the drive system, and a filter sub-system for use in such a hydraulic drive system.

Although the control circuit and the filter sub-system of the present invention may be utilized in hydraulic drive systems of various types, including such drive systems which effectively serve as the primary vehicle transmission during at least most of the vehicle operating cycle, the present invention is especially advantageous when used on a hydraulic drive system which comprises part of a vehicle hydraulic regenerative braking system, and will be described in connection therewith.

In a vehicle hydraulic drive system having regenerative braking capability, and assuming, by way of example only, that the vehicle is of the rear wheel drive type, the primary drive torque is transmitted from the engine through the conventional mechanical transmission, and then by means of a conventional drive line to the rear drive wheels. During braking (i.e., during the braking portion of a "deceleration-acceleration" cycle,) the kinetic energy of the moving vehicle is converted by the hydrostatic pump-motor unit, which is commanded to operate in its pumping mode, and the pump-motor unit charges a high pressure accumulator. When the vehicle is subsequently accelerated, the hydrostatic pump-motor unit is commanded to operate in its motoring mode, and the high pressure stored in the high pressure accumulator is communicated to the pump-motor unit. The resulting output torque of the pump-motor unit, now operating as a motor, is transmitted to the vehicle drive line.

It will be understood by those skilled in the art that there are several reasons why the present invention is especially suited for use in a drive system of the type described above, and which has regenerative braking capability. First, such a system typically includes not only the high pressure accumulator referred to, but also a low pressure accumulator. However, the presence of these two accumulators in the drive system complicates certain aspects of the configuration and the control of the drive system. Secondly, the presence of a pump-motor unit, which operates in a pumping mode for part of the vehicle cycle, and in a motoring mode for part of the vehicle cycle, introduces certain additional requirements and complications into the drive system and the controls therefor.

One of the complications which has been observed in a hydraulic drive system of the type to which the present invention relates, and which is used to accomplish regenerative braking, is the necessity to ensure proper filtration of the oil in what is essentially a "closed-loop" hydraulic system. In a conventional closed-loop hydrostatic transmission, or HST (i.e., a pump and motor combination), the pump almost always serves as a pump, and the motor almost always serves as a motor, during the normal propel operating cycle. In such a closed-loop HST system, it is conventional for some portion of the case drain fluid to be directed through a parallel circuit including elements such as a heat exchanger and a filter, after which that fluid is typically returned to the closed-loop circuit by means of a charge pump.

In the hydraulic drive system of the present invention, instead of a separate pump unit and motor unit, there is the above-described pump-motor unit. In view of the dual mode capability of the pump-motor unit of the type used in the hydraulic drive system of the present invention, it is not feasible simply to utilize the type of "parallel-path" filter circuit of the type typically utilized in closed loop HST systems, and described previously. In addition, whereas the "direction" of fluid flow in a typical closed-loop HST system remains the same throughout its operating cycles, in a hydraulic drive system of the type to which the present invention relates, many portions of the overall hydraulic system "see" fluid flow in one direction during one operating mode (e.g., deceleration) and "see" fluid flow in the opposite direction during the other mode (e.g., acceleration). As is well known to those skilled in the hydraulic circuit art, it is not feasible to utilize a conventional filter element in a circuit which experiences reversal of flow as part of its normal operation.

By way of example only, in a hydraulic drive system of the type to which the present invention relates, it is not advisable to locate a filter circuit or filter element in series flow relationship with the inlet of the pump-motor unit. When the pump-motor unit is operating in the pumping mode, the presence of a filter element in series with the pump inlet restricts pump inlet flow (especially after the filter element has collected a substantial amount of contaminant particles), thus resulting in cavitation of the unit (in the pumping mode) and excessive, undesirable noise emanating from the overall drive system. At the same time, it is not advisable to locate a filter element in series with the outlet of the unit (when it is operating in the motoring mode) because one result will be an increase in the total pressure drop across the unit, thus reducing the overall efficiency of the drive system. Another undesirable result would be that, as the filter element collects contamination particles, the pressure drop across the unit would vary, and therefore, the total system performance would also vary. If the filter element is located in series with the outlet of the unit (in the motoring mode) the filter element could rupture, and catastrophically contaminate the entire system. Moreover, because of the large flow rates involved, the filter element would have to be larger than is considered desirable, especially for mobile applications.

BRIEF SUMMARY OF THE INVENTION

Accordingly, it is an object of the present invention to provide an improved hydraulic drive system, and a control circuit therefor, of the type which may be utilized in connection with a vehicle hydraulic regenerative braking system, which overcomes the above disadvantages of the prior art.

It is another object of the present invention to provide such an improved hydraulic drive system which includes a filter sub-system capable of meeting the needs of the system, and of the pump-motor unit, both when the unit is in the pumping mode, and when the unit is in the motoring mode, with no substantial change in system performance as the filter element collects contamination particles.

It is yet another object of the present invention to provide such an improved filter sub-system which achieves the above-stated objects, and which defines two different flow paths, the first designed to provide relatively little flow restriction when the pump-motor unit is pumping, and the second to accomplish controlled filtration when the unit is motoring.

The above and other objects of the invention are accomplished by the provision of an improved hydraulic drive system adapted for use on a vehicle having an engine and a drive line operable to transmit driving torque from the engine to a drive axle. The drive system includes a hydrostatic pump-motor unit operable, in a pumping mode, to receive drive torque from the drive line and operable, in a motoring mode, to transmit drive torque to the drive line. A high-pressure accumulator is in fluid communication with a first port of the pump-motor unit through a mode valve means whereby, when the pump-motor unit is in the pumping mode, pressurized fluid is communicated from the pump-motor unit to the high pressure accumulator. When the pump-motor unit is in the motoring mode, pressurized fluid is communicated from the high pressure accumulator to the pump-motor unit. A low pressure accumulator is in fluid communication with a second port of the pump-motor unit.

The improved hydraulic drive system is characterized by a filter circuit disposed between the low pressure accumulator and the pump-motor unit. The filter circuit defines a relatively unrestricted first flow path from the low pressure accumulator to the second port when the pump-motor unit is in the pumping mode. The filter circuit defines a second flow path from the second port to the low pressure accumulator when the pump-motor unit is in the motoring mode. The second flow path comprises one path portion through a filter shut-off valve and a filter element in series, and in parallel therewith, another path portion through a controlled flow restriction, whereby one portion of the fluid flow from the second port flows through the filter element, and the remainder of the fluid flow from the second port flows through the controlled flow restriction.

In accordance with a more limited aspect of the invention, the hydraulic drive system is characterized by the relatively unrestricted first flow path defined by the filter circuit excluding the filter shut-off valve and the filter element.

DETAILED DESCRIPTION OF THE PREFERRED EMBODIMENT

Figure 1:
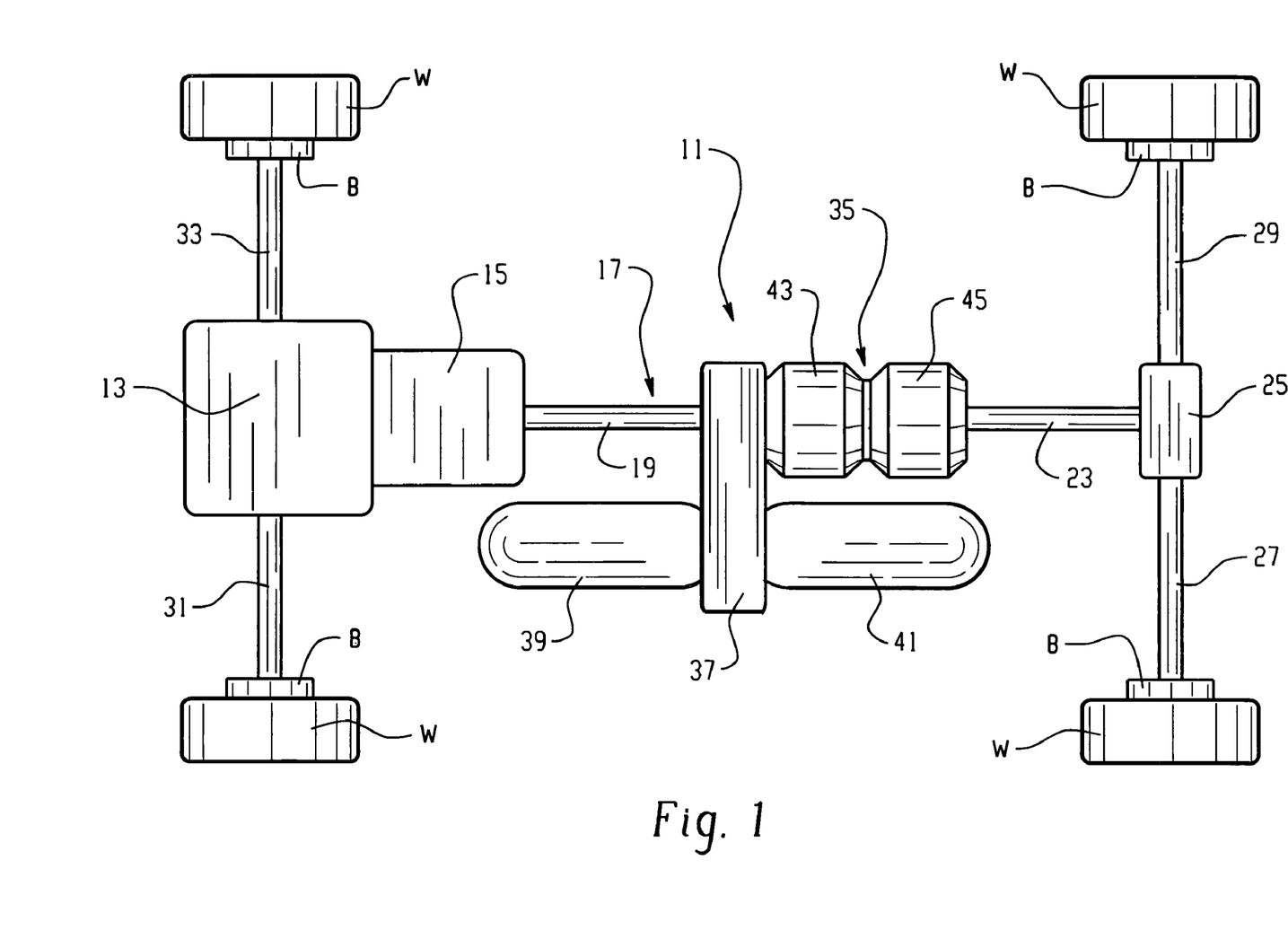
FIG. 1 is a schematic view of an entire vehicle drive system of the type with which the hydraulic drive system of the present invention is especially well suited.

Referring now to the drawings, which are not intended to limit the invention, FIG. 1 illustrates a vehicle drive system of the type for which the hydraulic drive system of the present invention is especially well suited. The vehicle system shown schematically in FIG. 1 has four drive wheels W, although it should be understood that the present invention is not limited to a vehicle having four-wheel drive (or even four drive wheels), but could also be used with a vehicle having only two-wheel drive, and in that case, the two drive wheels could be either rear drive wheels or front drive wheels. Operably associated with each of the drive wheels W is a conventional type of wheel brake B, the details of which form no part of the present invention, and the wheel brakes B will be referred to only briefly hereinafter. Preferably, the wheel brakes B are part of an overall EHB (electro-hydraulic brake) system, of the type which is just now becoming well known to those skilled in the art, and commercially available.

The vehicle includes a vehicle drive system, generally designated 11, which includes a vehicle engine 13 and a transmission 15. It should be understood that the particular type of engine 13 and transmission 15 and the construction details thereof, as well as the drive system arrangement, etc., form no part of the present invention, except to the extent specifically recited in the appended claims, and therefore, will not be described further herein. Furthermore, the present invention is not even limited specifically to use with what is normally thought of as an "engine", and therefore, it will be understood that, within the scope of the invention, references to an "engine" will mean and include any type of power source or other prime mover.

Extending rearwardly from the transmission 15 is a drive line, generally designated 17. In the subject embodiment, and by way of example only, the drive line 17 includes a forward drive shaft 19, an intermediate drive shaft (not visible in FIG. 1), a rearward drive shaft 23, an inter-wheel differential 25 and left and right rear axle shafts 27 and 29. Those skilled in the art will understand, from a subsequent reading and understanding of the present specification, that the drive line 17 has been illustrated and described as comprising the shafts 19 and 23 primarily to facilitate understanding of the overall vehicle drive system 11, and not by way of limitation.

The drive system 11, in the subject embodiment, also includes left and right forward axle shafts 31 and 33, respectively. Referring still primarily to FIG. 1, in addition to the "mechanical" elements already described and which are fairly conventional, the drive system 11 also includes a hydrostatic pump-motor unit, generally designated 35, and disposed forwardly of the pump-motor unit 35 is a valve manifold 37. Attached to a forward portion of the valve manifold 37 is a low pressure accumulator 39, and attached to a rear portion of the valve manifold 37 is a high pressure accumulator 41, although the particular arrangement could be reversed, or changed, or rearranged in some other manner. It should also be understood that the particular design and details of the valve manifold 37 (except to the extent noted hereinafter) and the accumulators 39 and 41 are not essential features of the present invention, and therefore, the construction details of each is not illustrated or described herein. Instead, the general function and operation of each will be described briefly, in connection with the system schematic of FIG. 2, but then only to the extent necessary to describe the several operating modes of the hydraulic drive system as "environment" for the explanation of the control circuit and the filter sub-system of the present invention.

Referring still primarily to FIG. 1, the pump-motor unit 35 will be described in slightly more detail, to facilitate an understanding of the overall hydraulic drive system shown in FIG. 1. The pump-motor unit 35 includes a clutch assembly portion, generally designated 43, and a pump-motor portion, generally designated 45. It may be seen that the intermediate drive shaft extends completely through the hydrostatic pump-motor unit 35 and would preferably have, at its forward end, a universal joint coupling (not shown herein), for connection to the forward drive shaft 19. Similarly, the intermediate drive shaft would preferably have, at its rearward end, a universal joint coupling (also not shown herein), for connection to the rearward drive shaft 23, although, within the scope of the invention, the particular arrangement shown and described could be reversed or changed in some other manner.

Figure 2:
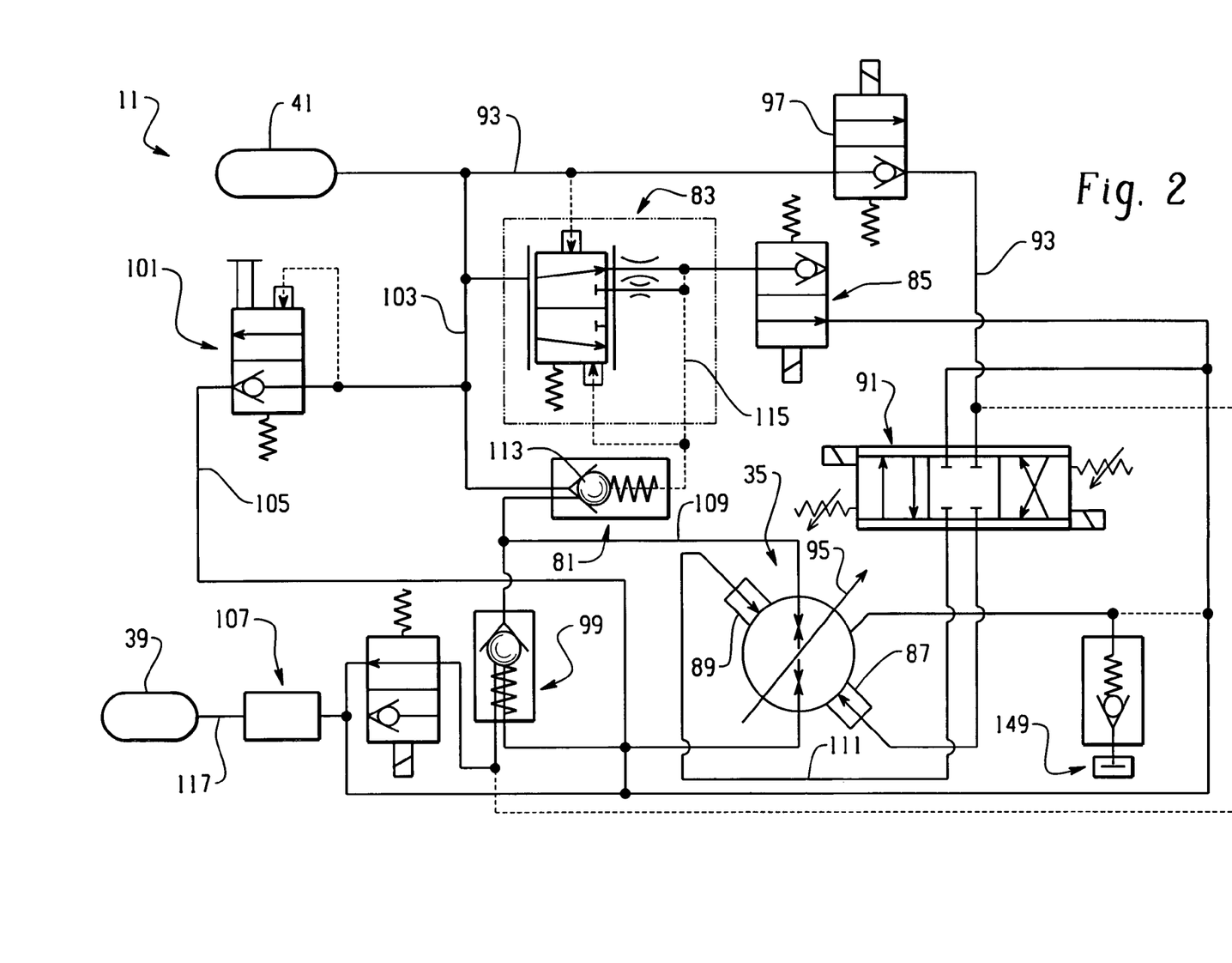
FIG. 2 is a hydraulic schematic of the hydraulic drive system of the present invention, including both the control circuit and the filter sub-system of the present invention, with the filter sub-system being shown only in schematic, block form.

Referring now primarily to FIG. 2, it should be understood that, other than the pump-motor unit 35 and the two accumulators 39 and 41, everything else shown in the hydraulic schematic of FIG. 2 would typically be included within the valve manifold 37, seen in FIG. 1 or attached to the valve manifold 37. It should also be understood that, whenever the pump-motor unit 35 is in its neutral (zero displacement) condition (which is the case whenever the vehicle is not in a deceleration-acceleration cycle), there is no substantial flow within the hydraulic system shown in FIG. 2, between the pump-motor unit 35 and the two accumulators 39 and 41. However, as is well known to those skilled in the art of such systems, because of the pre-charge on each of the accumulators 39 and 41, as will be discussed in greater detail subsequently, the system remains "pressurized" even while the pump-motor unit 35 is in its neutral condition.

The hydraulic system (as shown in FIG. 2), which is included within the valve manifold 37, includes a mode control valve 81, and operably associated therewith, a step-orifice control valve 83 and a solenoid-type mode pilot valve 85. The function and operation of the valves 81, 83 and 85 will be described in somewhat greater detail subsequently, although what will be said hereinafter about the valves 81, 83 and 85 will be by way of illustration and enablement of the present invention, and not by way of limitation of the present invention.

The pump-motor unit 35 is of the variable displacement type, and therefore, includes some sort of displacement-varying means, such as a pair of fluid pressure servo actuators of the type shown in FIG. 2 and designated 87 and 89. The servo actuators 87 and 89 are connected, hydraulically, to the outlets of a typical electro-hydraulic controller 91. The function of the controller 91 is to communicate pressurized fluid from a conduit 93 to one of the servo actuators 87 or 89, as appropriate to achieve the desired angle and displacement of a swashplate 95, all of which is generally well known to those skilled in the pump and motor art, and especially the axial piston pump art. Those skilled in the art of hydraulic drive systems of the type to which the invention relates will understand that, like typical HST systems, there can be mechanical feedback from the swashplate 95 of the pump-motor unit 35 to the controller 91. Preferably, however, feedback to the controller 91 is achieved electronically, even the indication of the position of the swashplate 95. It should be understood that any type of feedback is within the scope of the present invention.

Disposed in series between the high pressure accumulator 41 and the electro-hydraulic controller 91 is an isolation valve 97 which, as shown in FIG. 2, is preferably a poppet-type valve which is solenoid operated. Whenever the hydraulic drive system 11 is operating, the isolation valve 97 is "ON", i.e., high pressure is freely communicated from the high pressure accumulator 41 to the controller 91. Whenever the hydraulic drive system 11 is "OFF", the isolation valve 97 is spring biased to the position shown in FIG. 2 in which it keeps the pump-motor unit 35 and the controller 91 "isolated" hydraulically from the high pressure accumulator 41, so that the accumulator 41 does not "leak down" through the controller 91, while the system is not operating. References to the drive system being "OFF" will be understood to mean and include both that portion of the vehicle operating cycle when the vehicle is not in a deceleration-acceleration cycle, and those times when the vehicle is not operating at all (engine "off" conditions).

Referring still primarily to FIG. 2, the drive system 11 includes a bypass valve assembly, generally designated 99, which may also be referred to as an "unloading" valve or as a "dump" valve, as those terms are well understood in the valve art. Thus, the bypass valve assembly 99 will "unload" the pump-motor unit 35 whenever the engine is "off" (no driving pressure present in the conduits 93, 109 and 1 1 1), so that there is no unintended torque transmitted to the drive line 17. As is well known to those skilled in the art of hydraulic circuits, the bypass valve assembly 99 would typically be included in such a circuit to "unload" the pump-motor unit 35. It is believed to be within the ability of those skilled in the art to determine the specific design and operation of a particular sub-system, such as the bypass valve assembly 99.

The hydraulic drive system 11 also includes a relief valve, generally designated 101 which, as is shown in FIG. 2, is spring biased to a closed position. An inlet of the relief valve 101 is in communication with a conduit 103, which interconnects the inlet with the port of the high pressure accumulator 41 and with the inlet of the mode control valve 81. Whenever the pressure in the conduit 103 exceeds a predetermined maximum, the relief valve 101 is biased ("downward" in FIG. 2) to a position which permits communication from the conduit 103 to a conduit 105 (which may be considered the "low pressure" side of the system, as will become more apparent subsequently). Finally, referring still to FIG. 2, the hydraulic drive system 11 includes a filter circuit, generally designated 107 which will be described in greater detail subsequently.

Figure 3:
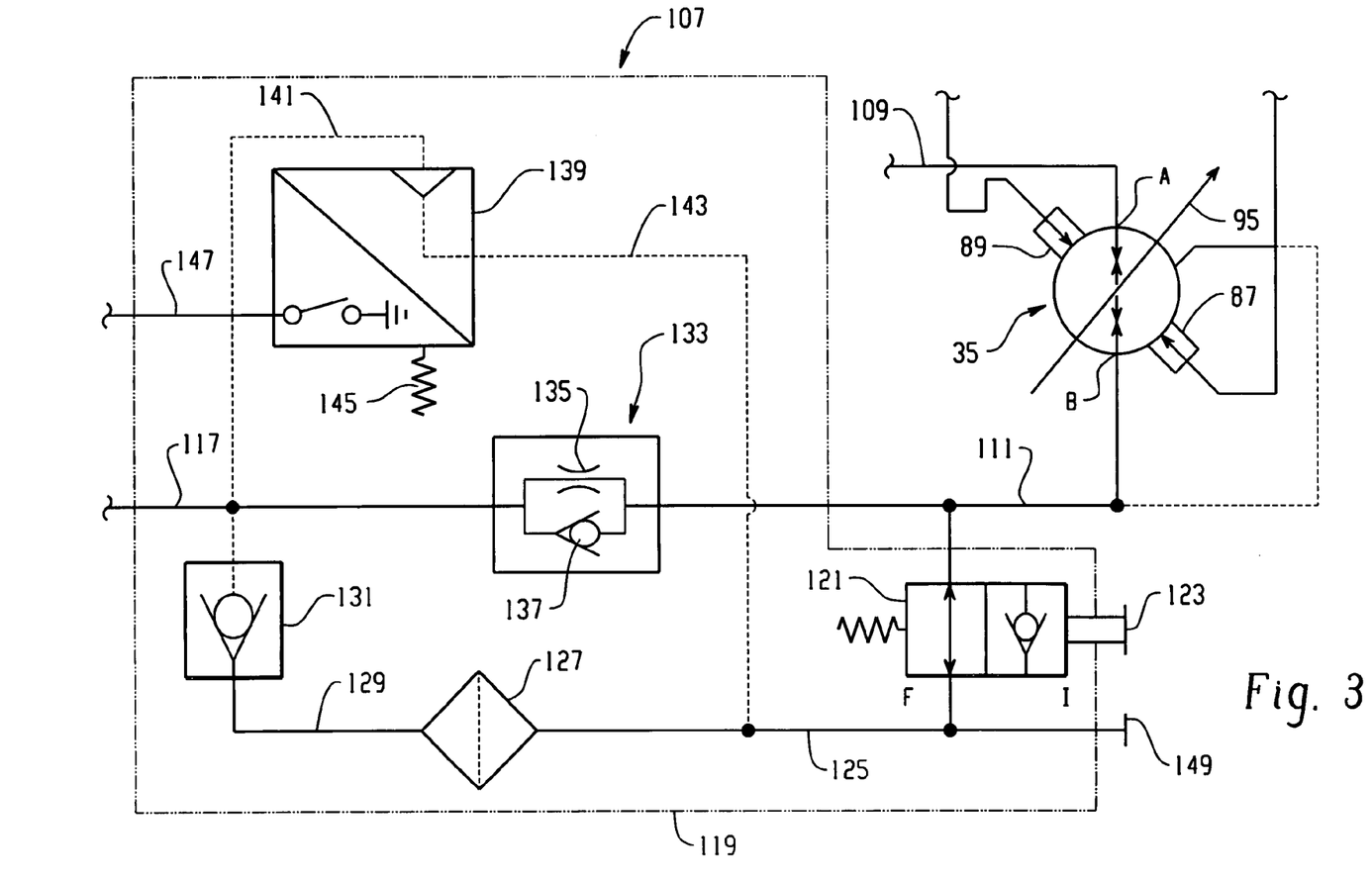
FIG. 3 is a detailed hydraulic schematic illustrating a preferred embodiment of the filter sub-system which comprises one important aspect of the present invention.

Referring now to FIGS. 2 and 3 together, it may be seen that the pump-motor unit 35 includes a port designated A which is connected by means of a conduit 109 to the mode control valve 81. The unit 35 also includes a port designated B which, by means of a conduit 111 is in fluid communication with the filter circuit 107, and also with the conduit 105, such that the conduits 105 and 111 comprise the "low pressure" side of the system, as was mentioned previously. As will be seen from the subsequent description, when the pump-motor unit 35 is in the pumping mode, the port A is the outlet port (see arrows in pump symbol in FIGS. 2 and 3), and when the unit 35 is in the motoring mode, the port A is the pressurized inlet port and the port B is the exhaust, outlet port.

Referring again primarily to FIG. 2, the general operation of the hydraulic drive system 11 will be described briefly. As was mentioned previously, when the vehicle is neither decelerating or accelerating the pump-motor unit 35 (pump-motor portion 45 of FIG. 1) is de-clutched from the intermediate drive shaft, and the overall vehicle drive system shown in FIG. 1 operates in the same manner as if the hydraulic drive system 11 were not present.

When the vehicle operator begins to perform a braking operation, one result is that the clutch assembly portion 43 is actuated, such that the pump-motor unit 35 is now clutched to the drive shaft, and an appropriate command is provided to the electro-hydraulic controller 91, displacing the swashplate 95 in a direction such that the rotation of the drive line 17 (with the vehicle moving in a forward direction) causes the pump-motor unit 35 to pump pressurized fluid from the port A to the conduit 109. As is now well known to those skilled in the art of hydraulic regenerative braking systems, the displacement of the swashplate 95 (and therefore, the fluid output per rotation of the drive line 17) is typically proportional to the extent to which the vehicle operator depresses the brake pedal. It is now known to those skilled in the art how to set the displacement of the swashplate 95 proportional to the brake torque applied by the operator, or to the displacement of the brake pedal, although the particular means, or criteria, selected for setting the displacement of the swashplate 95 is not essential to the present invention.

With the pump-motor unit 35 in the pumping mode, pressurized fluid communicated through the conduit 109 unseats a poppet member 113 in the mode control valve 81, such that the pressurized fluid flows into the conduit 103, and from there, pressurizes the high pressure accumulator 41. In the subject embodiment, and by way of example only, the high pressure accumulator 41 is of the gas-charge type. A hydraulic pressure is necessarily maintained such that a minimum amount of oil is always retained in the high pressure accumulator 41 (such that there is always a minimum charge of both of the conduits 93 and 103). At the end of a typical deceleration cycle, the high pressure accumulator 41 is charged up to the maximum system pressure, typically about 5000 psi.

At the completion of the deceleration portion of the braking cycle, when the vehicle operator releases the brake pedal and begins to depress the accelerator, an appropriate signal is communicated to the electromagnetic controller 91 which commands the pump-motor unit 35 to transition from the pumping mode (described previously), to the motoring mode. In the motoring mode, the swashplate 95 is disposed at an inclination opposite to that which existed when the unit was in the pumping mode (i.e., the swashplate 95 goes "over-center"). When the pump-motor unit 35 is in the motoring mode, the swashplate 95 is displaced such that flow through the pump-motor unit 35 (from port A to port B) will cause the pump-motor unit 35 to transmit torque to the drive line 17, tending to drive the drive line 17 in a direction corresponding to forward movement of the vehicle. In the subject embodiment, and by way of example only, the mode control valve 81 is constructed such that pressurized fluid can always flow from the conduit 109 to the conduit 103 (i.e., the pumping mode). However, only when the mode pilot valve 85 receives an appropriate input signal to its solenoid is there an appropriate pilot signal 115 which assists in the opening of the poppet member 113, to permit relatively unrestricted flow of high pressure fluid from the accumulator 41 through the conduit 103 and then through the conduit 109 to the port A of the pump-motor unit 35.

In the subject embodiment, and by way of example only, the low pressure accumulator 39 is also of the gas-charge type, and always maintains a minimum inlet charge pressure at the pump-motor inlet port B of about 50 psi., in the subject embodiment, and by way of example only. This is true even toward the end of the deceleration portion of the cycle, after the unit 35 has pumped up the high pressure accumulator 41). After the completion of the acceleration portion of the cycle, when the low pressure accumulator 39 contains almost all of the oil, the pressure in the low pressure accumulator 39 rises to about 150 psi, in the subject embodiment, and by way of example only.

Referring now primarily to FIG. 3, the filter circuit 107 will be described. Although it was mentioned previously that the conduits 105 and 111 comprise the low pressure side of the system, it should be understood that, because of the presence of the low pressure accumulator 39, the pressure in the conduit 111 would never, during normal operation of the system, be at essentially zero or reservoir pressure, as is the case in many hydraulic systems. Instead, as was mentioned previously, but by way of example only, the low pressure accumulator 39 insures that the conduits 117 and 111 are maintained at a pressure of at least about 50 psi, in this embodiment of the invention. As may also be seen in FIG. 2, the port of the low pressure accumulator 39 is in communication with the filter circuit 107 by means of the conduit 117 (partially shown also in FIG. 3).

Figure 4:
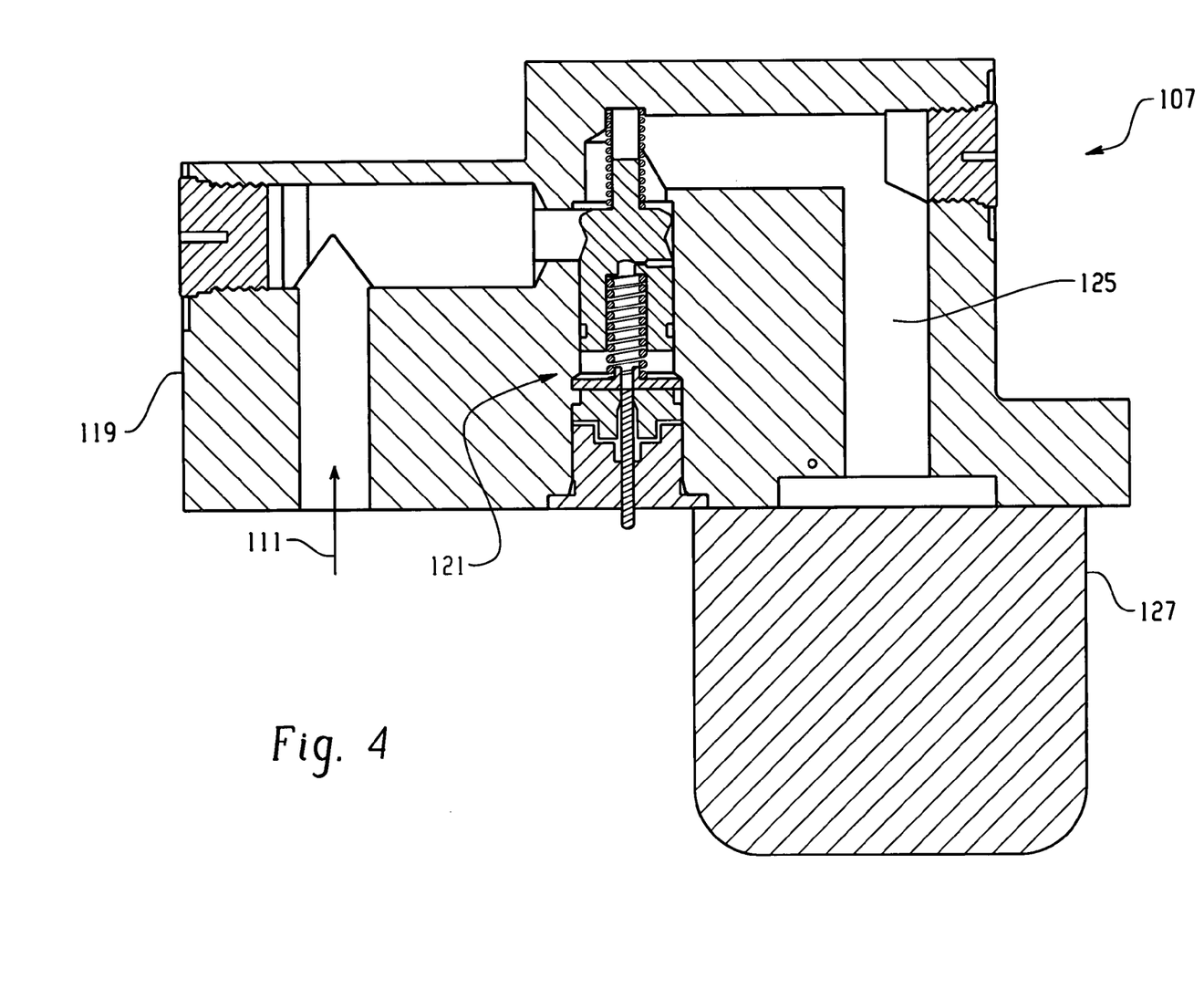
FIG. 4 is a view, partly in cross-section, and partly pictorial, of a preferred embodiment of the filter sub-system of the present invention.

Referring now to FIG. 3, in conjunction with FIG. 4, the filter circuit 107 would typically be disposed within a filter manifold, shown only schematically in FIG. 3, but shown as a valve housing in FIG. 4, and generally designated 119. Within the filter manifold 119 there is disposed a two-position, two-way filter shut-off valve 121, which is spring biased to an open position (the flow position "F" shown in FIG. 3), but the shut-off valve 121 may be manually displaced by any suitable means, such as a handle 123, to a position blocking flow therethrough (the isolation position "I" in FIG. 3). With the filter shut-off valve 121 in the open position shown in FIG. 3, low pressure fluid may flow from the conduit 111 to a conduit 125, which is shown in FIG. 3 as extending outside of the filter manifold 119 for reasons which will be described subsequently. The conduit 125 is in fluid communication with an "inlet" side of a filter element 127, with an "outlet" of the filter element 127 being connected by means of a conduit 129 to the inlet of a check valve 131 (which prevents back-flow through the filter element 127), and from there to the conduit 117.

The conduit 111 is also in communication with one port of an orifice and valve assembly, generally designated 133, the other port of the assembly 133 being in open communication with the conduit 117. Within the orifice and valve assembly 133 is a parallel path arrangement including a fixed flow orifice 135 and a check valve 137, the function of which will be described subsequently.

In accordance with one important aspect of the present invention, and as will be described in greater detail subsequently, one of the objects of the present invention is met by the provision of the filter circuit 107, as shown in FIG. 3, wherein flow passes through the filter element 127 while the pump-motor unit 35 is in its motoring mode only, but when the pump-motor unit 35 is in its pumping mode, the filter circuit 107 provides relatively little restriction to fluid flow from the low pressure accumulator 39 to the inlet port (port B) of the pump-motor unit 35.

The operation of the filter circuit 107 of the present invention will now be described in somewhat greater detail. When the pump-motor unit 35 is in its pumping mode, low pressure fluid (from about 150 psi. initially, down to about 50 psi., in the subject embodiment) from the low pressure accumulator 39 flows through the conduit 117 but is blocked by the check valve 131 from flowing through the filter element 127. Therefore, in this "first flow path" through the filter circuit 107, all of the flow from the low pressure accumulator 39 flows through the conduit 117 and then through the orifice and valve assembly 133. The arrangement of the assembly 133 provides a relatively unrestricted flow path through the assembly 133 (by unseating the check valve 137), and then through the conduit 111 to the inlet port (port B) of the pump-motor unit 35. In the above-described first flow path, some of the flow is through the fixed flow orifice 135, but typically, the majority of the flow in the pumping mode, would be through the unseated check valve 137.

When the pump-motor unit 35 is switched to the motoring mode, such that the port B is now the outlet port of the pump-motor unit 35, flow through the conduit 111 flows through a "second flow path" by means of which fluid returns to the low pressure accumulator 39. This second flow path includes two path portions in parallel. The one path portion flows through the filter shut-off valve 121, then through the conduit 125 and the filter element 127, then through the conduit 129 and past the unseated check valve 131 to the conduit 117. The other path portion flows through the orifice and valve assembly 133, but flow in the direction now being described can pass only through the fixed flow orifice 135, and then to the conduit 117, recombining with the fluid which has passed through the filter element 127.

Therefore, by appropriately selecting the filter element 127, and the fixed flow orifice 135, which is believed to be well within the ability of those skilled in the hydraulics art, it is possible to have approximately a predetermined percentage of the flow pass through the filter element 127 in the motoring mode. In the course of the development of the subject embodiment, and by way of example only, approximately eighty (80%) percent of the flow in the motoring mode passes through the fixed flow orifice 135, while the remaining twenty (20%) percent (of the total flow from port B to the accumulator 39) passes through the filter element 127. As is also well known to those skilled in the art, these relative percentages can be varied to achieve objectives such as a greater degree of filtration, on the one hand, or a reduced pressure drop through the filter circuit 107, on the other hand.

With flow through the filter element 127 occurring only during the motoring mode of the pump-motor unit 35, and with the low pressure accumulator 39 maintaining a relatively constant low pressure, the filter element 127 may be selected appropriately, with the system designer knowing that the filter element 127 will be subjected to only known, relatively constant, relatively low pressures at all times. If the filter element 127 were subjected, periodically, to substantially higher pressure drops, there would be a requirement for a more robust, and more expensive, filter arrangement, and filter element material.

As mentioned previously, the filter circuit 107 of the present invention accomplishes one of the objects of the invention by providing a relatively unrestricted flow path to the inlet (port B) of the pump-motor unit 35 whenever the unit 35 is in its pumping mode. Such unrestricted, low pressure flow to the inlet, in the pumping mode, is especially important to prevent cavitation during the pumping mode, and the noise which would result, especially when the hydraulic drive system 11 of the present invention is utilized as part of a hydraulic regenerative braking system and/or when the drive system 11 is utilized as part of an on-highway vehicle. As is well known to those skilled in the vehicle art, it is almost essential to minimize noise on most vehicles, but especially so for on-highway vehicles. As is also well known, cavitation could damage various parts of the pump-motor unit, thus reducing the useful life of the drive system.

Another benefit associated with the filter circuit 107 of the present invention is that, if and when the filter element 127 ever becomes partly or even totally plugged by contamination particles, there is still an available, separate flow path (through the fixed flow orifice 135), and there is no condition under which flow to or from the pump-motor unit 35 is totally blocked. Furthermore the relation between the filter element 127 and the fixed flow orifice 135 pre-determines how flow transitions from the filter element 127 fully to and through the orifice 135, as the filter element 127 becomes progressively filled with contamination particles. With a very minor increase in pressure drop, the full flow from the port B returns to the low pressure accumulator 139 through the orifice 135.

Furthermore, in regard to the issue of the filter element 127 becoming sufficiently plugged with contamination particles, it may be seen in FIG. 3 that the filter circuit 107 includes a pressure-actuated electrical relay device, generally designated 139. The relay device 139 receives a pilot signal 141 from the conduit 117, and also receives a pilot signal 143 from the conduit 125. If the pressure differential between the pilot signals 141 and 143 (143 should always be higher than 141 in the motoring mode), is sufficient to overcome the force of a biasing spring 145, the relay within the device 139 is closed, thus transmitting an electrical signal 147 to an appropriate warning device, such as an electronic controller, or a warning light or a buzzer in the operator's compartment.

In accordance with another aspect of the invention, replacement of the filter element 127 (when it becomes sufficiently plugged with contamination particles) may be accomplished without the need for de-pressurizing and draining the closed loop hydraulic drive system 11 shown in FIG. 2. As is understood by those skilled in the art of such closed loop drive systems, that provide long fluid life, the low pressure side is always pressurized. The pressure swings from a low to a high depending on the amount of fluid in the low pressure accumulator 39 (for example, between 50 psi. and 150 psi. in this embodiment). This is true even when the vehicle engine is in an "off" condition.

When it is desired to replace the filter element 127 with a new, clean element, all that is required, in the subject embodiment, is to depress the handle 123, moving the filter valve 121 to the left from the position shown, to a position in which flow from the conduit 111 to the conduit 125 is blocked. Within the scope of the invention, the spring biasing the filter shut-off valve 121 and the handle 123 could be reversed. Once that blocking of flow to the conduit 125 has occurred, the rest of the hydraulic drive system 11 is isolated from the path portion which includes the conduits 125 and 129 and the filter element 127. Therefore, the filter element 127 may then be replaced, and to the extent any fluid is drained from either of the conduits 125 or 129 as a result, the filter path portion (conduit 125) can be refilled by means of an air bleed and fill valve 149 (see FIG. 2), and also by pre-filling the new filter element before it is installed in the circuit.

As should be apparent to those skilled in the art, another benefit of the filter circuit 107 of the present invention is the ease of "adjustability", i.e., the ease of changing, on a future model of the drive system 11, the percentage of fluid flow which flows through the filter element 127, versus the percentage of fluid flow which flows through the fixed flow orifice 135. By way of example, the fixed flow orifice 135 could comprise an orifice member, such that the entire filter circuit 107 and filter manifold 119, etc. could remain the same, with the only change for the prospective, future model of the drive system being the replacement of one particular size of orifice member with another orifice member providing a different size of fixed flow orifice 135, and therefore, a different percentage of the total fluid flow (from the port B to the accumulator 39) passing through the filter element 127.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A hydraulic drive system adapted for use on a vehicle having an engine and a drive-line operable to transmit driving torque from said engine to a drive axle, said drive system including a hydrostatic pump-motor unit operable, in a pumping mode, to receive drive torque from said drive-line, and operable, in a motoring mode, to transmit drive torque to said drive-line; a high pressure accumulator in fluid communication with a first port of said pump-motor unit through a mode valve means whereby, when said pump-motor unit is in said pumping mode, pressurized fluid is communicated from said pump-motor unit to said high pressure accumulator, and when said pump-motor unit is in said motoring mode, pressurized fluid is communicated from said high pressure accumulator to said pump-motor unit; a low pressure accumulator in fluid communication with a second port of said pump-motor unit; characterized by:

(a) a filter circuit disposed between said low pressure accumulator and said pump-motor unit;

(b) said filter circuit defining a relatively unrestricted first flow path from said low pressure accumulator to said second port when said pump-motor unit is in said pumping mode;

(c) said filter circuit defining a second flow path from said second port to said low pressure accumulator when said pump-motor unit is in said motoring mode; and (d) said second flow path comprising one path portion through a filter shut-off valve and a filter element in series, and in parallel therewith, another path portion through a controlled flow restriction, whereby one portion of the fluid flow from said second port flows through said filter element, and the remainder of said fluid flow from said second port flows through said controlled flow restriction.

2. A hydraulic drive system as claimed in claim 1, characterized by said controlled flow restriction being selected and sized, relative to said filter shut-off valve, such that said one portion of the fluid flow from said port comprises approximately a predetermined percentage of the total fluid flow from said port.

3. A hydraulic drive system as claimed in claim 1, characterized by said filter shut-off valve comprises a two-position, two-way valve including a flow position defining said one path portion, and an isolation position blocking flow from said port through said filter element whereby, when said filter shut-off valve is in said isolation position, said filter element can be replaced without draining fluid from the rest of said hydraulic drive system.

4. A hydraulic drive system as claimed in claim 1, characterized by said relatively unrestricted first flow path defined by said filter circuit excludes said filter valve and said filter element.

\* \* \* \* \*